United States Patent
Dyck et al.

(10) Patent No.: US 8,588,253 B2
(45) Date of Patent: Nov. 19, 2013

(54) METHODS AND APPARATUSES TO REDUCE CONTEXT SWITCHING DURING DATA TRANSMISSION AND RECEPTION IN A MULTI-PROCESSOR DEVICE

(75) Inventors: Jeffrey A. Dyck, San Diego, CA (US); Brian F. Costello, Boulder, CO (US); Vamsi K. Dokku, San Diego, CA (US); Udayakumar U. Menon, San Diego, CA (US); Amit M. Singh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 505 days.

(21) Appl. No.: 12/491,993

(22) Filed: Jun. 25, 2009

(65) Prior Publication Data

US 2009/0323686 A1 Dec. 31, 2009

Related U.S. Application Data

(60) Provisional application No. 61/076,088, filed on Jun. 26, 2008.

(51) Int. Cl.
*H04J 3/24* (2006.01)
*G06F 9/46* (2006.01)

(52) U.S. Cl.
USPC .......................................... 370/473; 718/108

(58) Field of Classification Search
USPC .......... 370/390, 389, 473; 709/219, 213, 201; 710/300; 718/100, 108; 455/412.1; 712/225
See application file for complete search history.

(56) References Cited

U.S. PATENT DOCUMENTS

| 5,883,722 | A  | * | 3/1999  | Baumler        | 358/296   |
|-----------|----|---|---------|----------------|-----------|
| 6,438,137 | B1 | * | 8/2002  | Turner et al.  | 370/466   |
| 6,907,024 | B2 |   | 6/2005  | Regis          |           |
| 6,907,042 | B1 |   | 6/2005  | Oguchi         |           |
| 6,987,961 | B1 | * | 1/2006  | Pothana        | 455/412.1 |
| 7,136,377 | B1 | * | 11/2006 | Tweedly et al. | 370/356   |

(Continued)

FOREIGN PATENT DOCUMENTS

| CN | 1833444 A   | 9/2006  |
|----|-------------|---------|
| JP | H05298119 A | 11/1993 |

(Continued)

OTHER PUBLICATIONS

International Search Report and Written Opinion—PCT/US2009/048962, International Search Authority—European Patent Office—Dec. 10, 2009.

(Continued)

*Primary Examiner* — Ayaz Sheikh
*Assistant Examiner* — Hoang-Chuong Vu
(74) *Attorney, Agent, or Firm* — Kevin T. Cheatham

(57) ABSTRACT

A method and apparatus are provided for efficiently transferring data between a first and second processors having shared memory. A plurality of data packets are aggregated into a packet bundle at the first processor. The packet bundle is then transferred from the first processor to the second processor using the shared memory, wherein the transfer of the packet bundle is performed in a single context switch at the first processor. The packet bundle is then unbundled into individual data packets at the second processor, wherein a processing load of the second processor is reduced due to the aggregation of the data packets into the packet bundle by the first processor.

6 Claims, 10 Drawing Sheets

(56) References Cited

U.S. PATENT DOCUMENTS

| | | | |
|---|---|---|---|
| 7,529,924 B2* | 5/2009 | Sydir et al. | 713/153 |
| 7,610,330 B1* | 10/2009 | Quinn et al. | 709/201 |
| 7,752,325 B1* | 7/2010 | Yadav et al. | 709/231 |
| 2003/0007488 A1* | 1/2003 | Rao | 370/390 |
| 2003/0126233 A1* | 7/2003 | Bryers et al. | 709/219 |
| 2004/0252721 A1* | 12/2004 | Lingafelt et al. | 370/473 |
| 2004/0257986 A1 | 12/2004 | Jha et al. | |
| 2005/0220111 A1 | 10/2005 | Mann et al. | |
| 2006/0059287 A1* | 3/2006 | Rivard et al. | 710/300 |
| 2006/0277267 A1* | 12/2006 | Lok | 709/213 |
| 2007/0008983 A1 | 1/2007 | Van Doren et al. | |
| 2007/0106990 A1* | 5/2007 | Kissell | 718/102 |
| 2008/0101355 A1* | 5/2008 | Ojala et al. | 370/389 |
| 2008/0140977 A1* | 6/2008 | Shimakura et al. | 711/169 |
| 2009/0012958 A1* | 1/2009 | Raj | 707/6 |
| 2009/0064140 A1* | 3/2009 | Arimilli et al. | 718/100 |
| 2009/0183154 A1* | 7/2009 | Miskelly et al. | 718/100 |
| 2009/0282226 A1* | 11/2009 | Hoover et al. | 712/225 |

FOREIGN PATENT DOCUMENTS

| | | |
|---|---|---|
| JP | 2000332817 A | 11/2000 |
| JP | 2006525578 A | 11/2006 |
| WO | WO03001766 A2 | 1/2003 |

OTHER PUBLICATIONS

Taiwan Search Report—TW098121704—TIPO—Jan. 10, 2013.

* cited by examiner

METHODS AND APPARATUSES TO REDUCE CONTEXT SWITCHING DURING DATA TRANSMISSION AND RECEPTION IN A MULTI-PROCESSOR DEVICE

CLAIM OF PRIORITY

As provided in 35 U.S.C. §119, this application claims priority to Provisional Application No. 61/076,088 entitled METHODS AND APPARATUSES TO REDUCE CONTEXT SWITCHING DURING DATA NETWORKING IN DUAL PROCESSOR ACCESS TERMINALS filed on Jun. 26, 2008 and assigned to the assignee of this application, the contents of which is incorporated by reference into this document.

FIELD

One feature relates to communication systems, and more particularly, to a method for reducing context switching and interruptions of processors during data transfer between two or more processors.

BACKGROUND

As consumers seek every more mobile technologies and convenience, more content and services are being delivered to mobile and/or compact devices. At the same time, access terminals, such as mobile phones, are ever smaller or compact in size to allow users to conveniently carry them anywhere they go. Due to their small size, the access terminals often have limited processing capabilities and/or power source (e.g., batteries). A trade-off is often made between processing performance and battery life. More powerful processors consume more power, thereby shortening the life of the battery between charging. However, less powerful processors may not provide sufficient processing power needed for newer applications. For example, with the advent of third generation (3G) and fourth generation (4G) telecommunication standards based on the International Telecommunication Union (ITU), high speed data applications (e.g., internet access, voice over IP, video delivery, etc.) are being implemented for wireless networks. The higher data rates provided by 3G and 4G networks place increasing pressure on processor cores with limited clock rate to support these higher data rates. For handset manufacturers and other original equipment (OEMs) manufacturers that incorporate wireless communication chips and chip sets, these factors lead to added pressure to support the high speed data applications by using off-the-shelf (OTS) commercial mobile operating systems, such as, Windows Mobile, Linux, or Symbian. Unfortunately, such mobile operating systems frequently consume significant processing time in switching contexts, presenting a major hurdle for efficiently supporting next generation high data rates, especially for layered software architectures required by OTS mobile operating systems. Moreover, mobile device hardware typically attempts to reduce the clock rate of the processor core in an effort to conserve or otherwise minimize power consumption.

Consequently, techniques are needed to reduce power consumption of limited clock rate processors without sacrificing processing performance for higher data rates.

SUMMARY

The following presents a simplified summary of one or more embodiments in order to provide a basic understanding of some embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to one feature, a method operational in a first processor is provided for transferring data to a second processor. Data packets may be aggregated into a packet bundle by the first processor. The first processor may then process the packet bundle in a single context switch when transferring the packet bundle to the second processor via a shared memory, where a processing load of the first processor is reduced due to the aggregation of the data packets into the packet bundle. Additionally, the processing load of the second processor may also be reduced due to the aggregation of the data packets into the packet bundle. Aggregating data packets into the packet bundle may also reduce context switching at the second processor. Context switch may include the interleaved sharing of a processing resource by multiple functions. Context switching at the first processor may be reduced by virtue of aggregating the data packets into a packet bundle so that fewer data transfer operations are performed by the first processor for the same amount of data packets.

The packet bundle may be transferred to the second processor upon the occurrence of one or more triggers. For example, the one or more triggers may include at least one of: (a) a timeout trigger based on a maximum amount time between successive transfers of packet bundles from the first processor to the second processor; (b) a queue level trigger based on a size for a transmit queue where the data packets are aggregated into the packet bundle; (c) a buffer usage trigger based on the usage of a transfer buffer within the shared memory used to transfer the packet bundle between the first processor and second processor; (d) a load trigger based on the load for the second processor; or (e) a minimum data rate trigger based on a data rate at which the second processor transmits information over a wireless network.

The first processor may implement functions across multiple layers and performs context switching between the functions. The functions may include a function driver and an interconnect driver that transfer data between each other via a transmit queue and a receive queue. In one example, the interconnect driver may control the aggregation of the data packets in the transmit queue and schedules the transfer of the packet bundle to the second processor. In an alternative example, the function driver may control the aggregation of data packets in the transmit queue and schedules the transfer of the packet bundle to the second processor.

According to one feature, a method operational in a first processor for receiving data transfers from a second processor. The first processor may receive an interrupt indicating that the data bundle is being transferred from the second processor. The packet bundle is then obtained from the second processor via a shared memory in a single context switch, wherein the packet bundle includes aggregated data packets. The first processor may then unbundle the packet bundle into a plurality of data packets, wherein a processing load of the first processor is reduced due to the aggregation of the data packets into the packet bundle by the second processor. The processing load of the second processor may also be reduced due to the aggregation of the data packets into the packet bundle. The first processor may implement functions across multiple layers and may perform context switching between the functions. Such functions may include a function driver and a interconnect driver that transfer data between each other via a transmit queue and a receive queue.

An access terminal is also provided comprising a first processor and a second processor and adapted to transfer data from the first processor to the second processor. A plurality of data packets may be aggregated into a packet bundle at the first processor. The packet bundle is then transferred from the first processor to the second processor using a shared memory, wherein the transfer of the packet bundle is performed in a single context switch at the first processor. The second processor may receive an interrupt indicating that the packet bundle is being transferred from the first processor, wherein the number of interrupts at the second processor is reduced due to the aggregation of the data packets at the first processor. The packet bundle may the be unbundled into individual data packets at the second processor, wherein a processing load of the second processor is reduced due to the aggregation of the data packets into the packet bundle by the first processor. The first processor and second processors may each implements functions across multiple layers, where the functions at each of the first and second processors may include a function driver and an interconnect driver that transfer data between each other via a transmit queue and a receive queue.

Similarly, a second plurality of data packets may be aggregated into a second packet bundle at the second processor. The second processor then transfers the second packet bundle to the first processor using the shared memory, wherein the transfer of the packet bundle is performed in a single context switch at the second processor. The first processor then unbundles the second packet bundle into individual data packets, wherein a processing load of the first processor is reduced due to the aggregation of the data packets into the second packet bundle by the second processor.

In one example, the first processor may be an application processor and the second processor may be a modem processor, both processors operating within a wireless communication device. Alternatively, the second processor may be an application processor and the first processor may be a modem processor, both processors operating within a wireless communication device.

DETAILED DESCRIPTION

In the following description, specific details are given to provide a thorough understanding of the embodiments. However, it will be understood by one of ordinary skill in the art that the embodiments may be practiced without these specific details. For example, circuits may be shown in block diagrams, or not be shown at all, in order not to obscure the embodiments in unnecessary detail. In other instances, well-known circuits, structures and techniques may not be shown in detail in order not to obscure the embodiments.

As used herein, the term "access terminal" may refer to, but is not limited to, a mobile phone, a cellular phone, a communication device, a wireless device, a satellite radio, a personal digital assistant, a laptop, and/or a palm-held computing device having wireless communication capabilities. The term "data" refers to all types of information and/or content that may be transmitted between processor or through a network.
Overview One feature provides a data aggregation scheme for reducing interrupts and/or context switching when transferring data between a first processor and a second processor on the same device. The first processor aggregates or accumulates data packets into a packet bundle to be transferred to the second processor. The aggregated data packets are then transferred from the first processor to the second processor in a single context switch and based at least in part on one or more triggers. A shared memory or transfer buffer accessible to both the first processor and second processor may be used to transfer the aggregated data packets. The second processor receives an interrupt indicating that data is being transferred from the first processor. By aggregating the data packets at the first processor, the number of context switches at the first and/or second processors is reduced. The aggregated data packets may then be unbundled at the second processor and sent along to a higher application layer or for transmission over a wireless network or tethered device.

Figure 1:
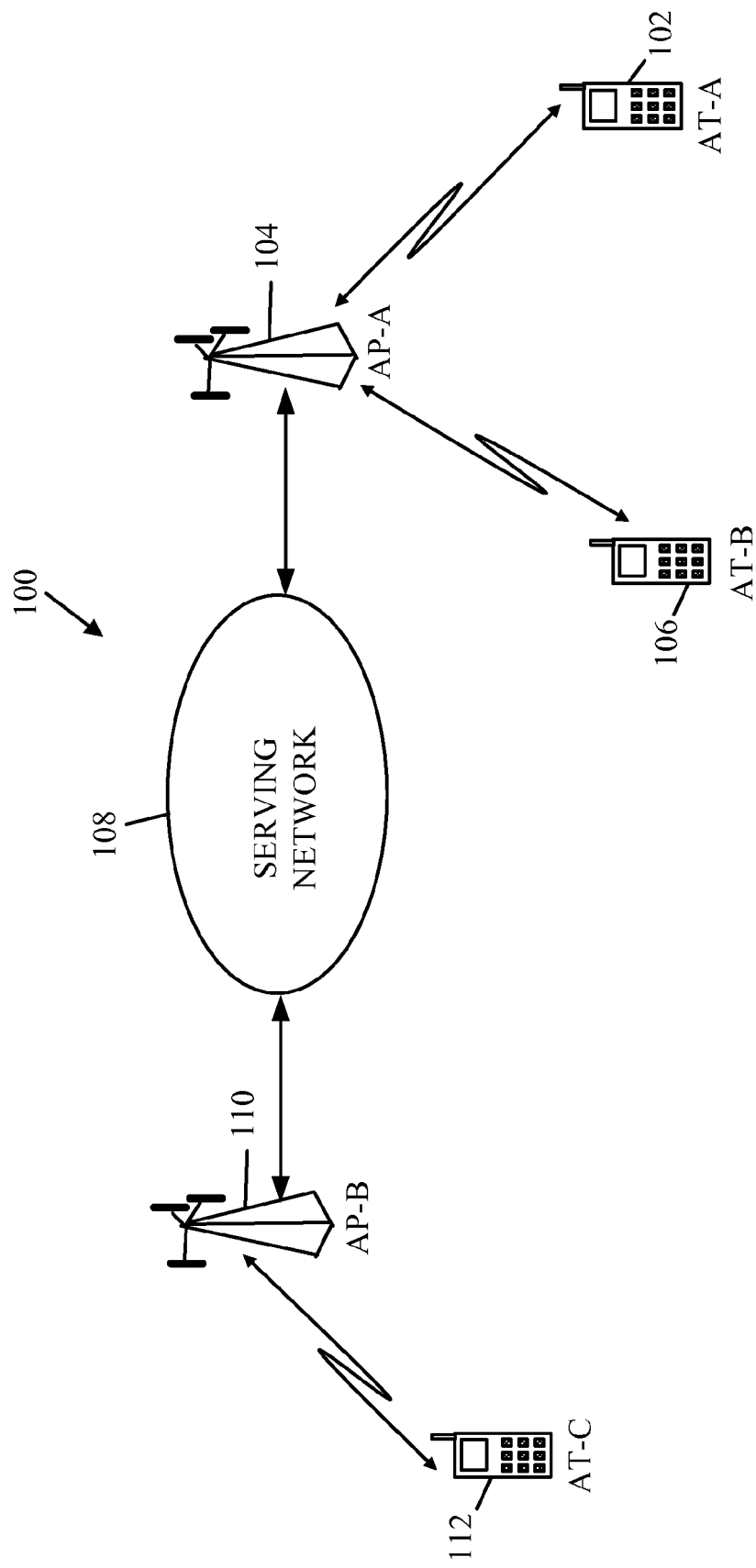
FIG. 1 is a block diagram illustrating how one or more access terminals may operate within a communication network.

The data aggregation may be performed to match channel characteristics of a communication channel (e.g., transmission channel for a wireless network) and to effectively reduce context switches, thereby improving (reducing) processor utilization and increasing processor idle time. Intelligent scheduling of aggregated data transfer between the first and second processors may be based on calculations of low and high queue levels in a queue used for the data transfer. These related queue levels may be adjusted for differing network data rates. A timeout timer may also be utilized to guarantee transfer of aggregated data packets within a predefined period of time. Additionally, other triggers may be utilized to determine when aggregated data should be transferred. For example, a buffer usage trigger may be used, where the buffer usage trigger is based on the usage or capacity of a transfer buffer utilized to transfer the aggregated data between the first processor and second processor. Similarly, a load trigger may also be used, where the load trigger may be based on the processing load for the second processor. In another example, a minimum data rate trigger based on a data rate at which the second processor transmits information over a wireless network.
Communication System FIG. 1 is a block diagram illustrating how one or more access terminals may operate within a communication network. A communication network 100 may include one or more access points AP-A 104 and AP-B 110 communicatively coupled to a serving network 108. The serving network 108 may include one or more network infrastructure devices that facilitate subscriber authentication, session setup, call routing, data or content delivery, etc. The serving network 108 may also be coupled to other networks to provide services across different territories and/or networks.

One or more access terminals AT-A 102, AT-B 106, and AT-C 112 may obtain service and/or communicate over the serving network 108 via the access points AP-A 104 and AP-B 110. Although just three access terminals AT-A 102, AT-B 106, and AT-C 112 are depicted, it is to be appreciated that the communication network system 100 may service any number of access terminals. According to various implementations, the serving network may support high data rate services to/from the access terminals AT-A 102, AT-B 106, and AT-C 112. In one example, the access terminal AT-A 102, AT-B 106, and AT-C 112 may include a rechargeable power source (e.g., battery) and is adapted to perform one or more techniques to reduce context switching, thereby increasing idle time for one or more processors and conserving battery power.

Note that a communication link or channel from an access point to an access terminal is often referred to as a forward link or downlink. A communication link or channel from an access terminal to an access point may be referred as a reverse link or the uplink.

Figure 2:
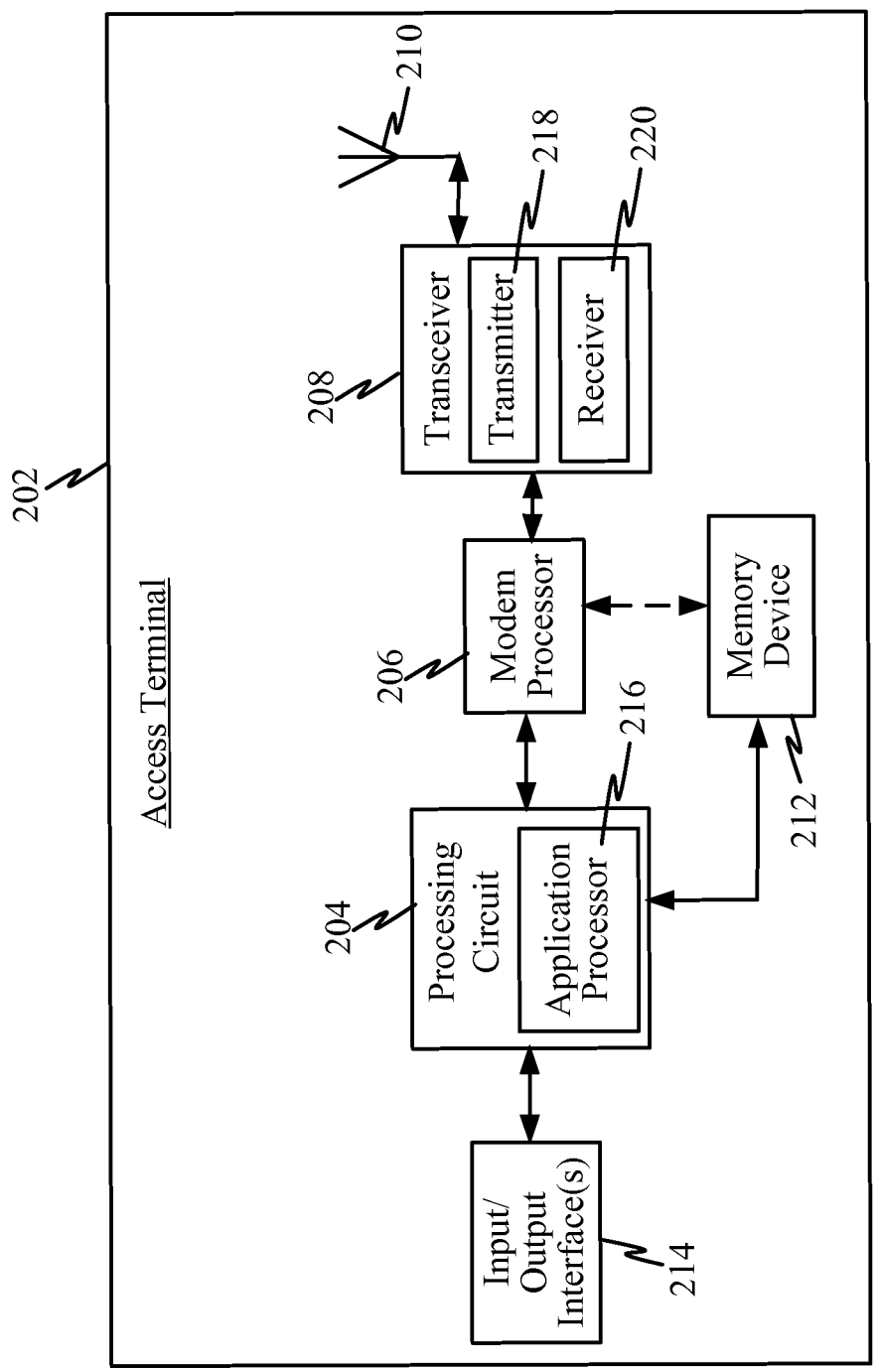
FIG. 2 is a block diagram illustrating one example of an access terminal.

FIG. 2 is a block diagram illustrating one example of an access terminal. The access terminal 202 may include a processing circuit 204 that may include one or more processors, such as an application processor 216 that executes applications on the access terminal. The processing circuit 204 may be coupled to a modem processor 206 that is coupled to a transceiver 208 (e.g., transmitter 218 and receiver 220 modules) that is coupled to an antenna 210. The processor architecture defined by the application processor 216 and modem processor 206 may be referred to as a dual processor system.

The processing circuit 204, modem processor 206, and transceiver 208 may form a transmit chain and/or a receive chain that operates to process, transmit and/or receive one or more concurrent or serial data streams to and/or from the access terminal 202. In one example, each data stream may be transmitted over a respective transmit antenna. For data to be transmitted, the modem processor 206 may modulate the data by formatting, coding, and/or interleaving the traffic data for each data stream based on a particular coding scheme selected for that data stream to provide coded data. Similarly, for received data, the modem processor 206 may demodulate the data by de-interleaving, decoding, and/or extracting the traffic data for each data stream based on the particular coding scheme being used. At the transceiver 208, the transmitter module 218 may processes a data stream to provide one or more analog signals and may further condition (e.g., amplify, filter, and/or up convert) the analog signals to provide a modulated signal suitable for transmission over the antenna 210. Similarly, the receiver module 220 may receive modulated signals from the antenna 210 and may condition (e.g., filter, amplify, and/or downconvert) a received signal, digitizes the conditioned signal to provide samples, and further processes the samples to provide a corresponding received data stream.

The processing circuit 204 may also be coupled to a memory device 212 and one or more input/output interfaces 214. The memory device 212 may serve to store information, data, and/or applications that are executed by the processing circuit 204. In an optional implementation, the memory device 212 may be optionally coupled to the modem processor 206 and serve as a transfer buffer between the application processor and the modem processor. The input/output interfaces 214 may include a display screen, a microphone, a speaker, a keypad, a touch screen, among other interfaces. Note that in other implementations, the processing circuit 204, the application processor 216, and/or the modem processor may be coupled to a common data bus.

In one example, the modem processor 206 and the application processor 216 may reside on the same circuit or board of the access terminal 202. In another example, the modem processor 206 and application process 216 may be on separate circuit boards. For instance, the modem processor 206 may be part of an independent or removable communication card that plugs into the access terminal 202. Moreover, each of the modem processor 206 and/or application processor 216 may be implemented as one or multiple processors.

According to some features, the access terminal 202 may be adapted to comply with 3G and/or 4 G communication standards that use high speed data access technologies. However, the processing circuit 204 (or application processor 216) and/or the modem processor 206 may have a limited clock rates relative to the processing overhead required to reach the high data rates of 3G and/or 4 G communications.

The processing circuit 204 and/or application processor 216 may execute a commercial mobile operating system, such as, Windows Mobile, Linux, or Symbian. Such operating systems frequently consume significant processing time in context switching, presenting a major hurdle for efficiently supporting next generation high data rates, especially for layered software architectures used by many mobile operating systems.

The term "context switching" refers to the computing process of storing and restoring the state (context) of a processor such that multiple processes can share a single processor resource. The context switch may be employed by a multitasking operating system to perform multiple operations in seemingly concurrent basis by sharing or interleaving a processing resource. Context switches are usually computationally intensive and much of the design of operating systems is to optimize the use of context switches. According to various examples, a context switch can mean a register context switch, a thread context switch, and/or a process/function context switch. What constitutes the context may be determined by the processor and/or the operating system being used.

In order to achieve the highest performance in the most energy efficient manner possible, the access terminal may be adapted to reduce the clock rate and/or decrease the idle cycle of the processing circuit 204 (or application processor 216) and/or the modem processor 206 so as to conserve power or otherwise minimize battery consumption.

Data Aggregation Example

According to one feature, data aggregation may be employed within a processor to match channel characteristics of a communication channel and to effectively reduce context switches, thereby improving (reducing) processor utilization and increasing processor idle time.

Figure 3:
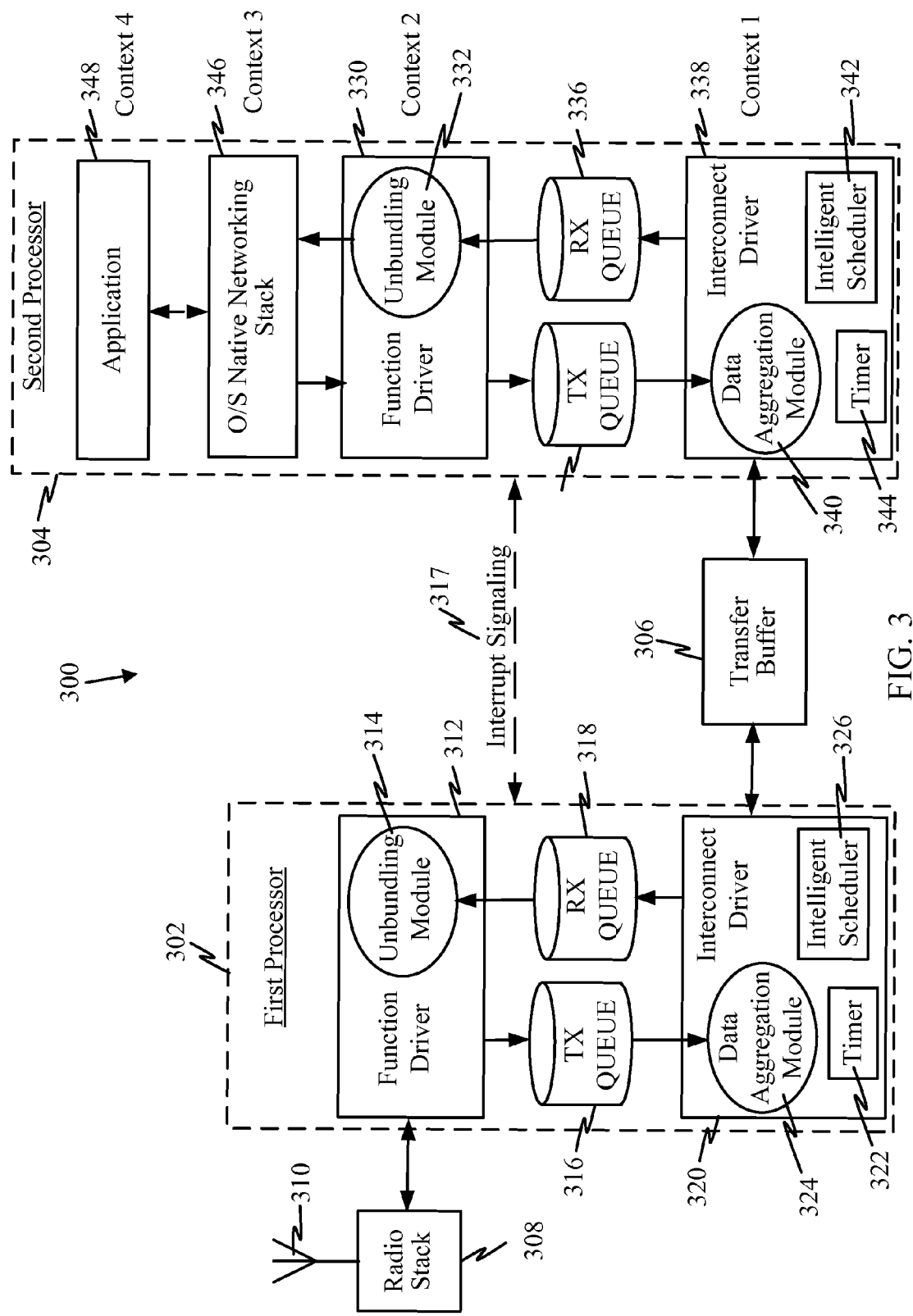
FIG. 3 illustrates a dual processor architecture which may be adapted to perform data aggregation.

FIG. 3 illustrates a dual processor architecture which may be adapted to perform data aggregation. The dual processor architecture 300 may include a first processor 302 and a second processor 304. The dual processor architecture 300 may be implemented, for example, as part of an access terminal. The first processor 302 may be, for example, a modem processor for implementing a radio stack for a particular wireless communication standard (e.g., air interface). The second processor 304 may be, for example, an application processor for executing one or more applications 348. The first processor 302 and second processor 304 may exchange data by using a transfer buffer 306 (e.g., a shared memory, etc.). The first processor 302 may also be coupled to a radio stack 308 and an antenna 310 for receiving and transmitting data over a wireless network.

The first processor 302 may include or implement a function driver 312, an unbundling module 314, a transmit (Tx) queue 316, a receive (Rx) queue 318, and/or an interconnect driver 320. The function driver 312 may include or implement an unbundling module 314. The interconnect driver 320 may include or implement a timer 322, a data aggregation module 324, and/or an intelligent scheduler 326

The second processor 304 may include or implement a function driver 330, a transmit (Tx) queue 334, a receive (Rx) queue 336, and/or interconnect driver 338, an operating system networking stack 346, and/or one or more applications 348. The function driver 330 may include or implement an unbundling module 332. The interconnect driver 338 may include or implement a data aggregation module 340, intelligent scheduler 342, and/or a timer 344.

The elements and/or modules illustrated for the first processor 302 and second processor 304 may be functional components operating within each processor and/or may be combined with other components. In one example, the transfer buffer 306 may be a shared memory space or device accessible by the first and second processors 302 and 304. In some examples, the first and/or second processors 302 and 304 may include internal memory in which the TX queue and RX queue are implemented. In other implementations, the TX queues and RX queues may be implemented in a shared memory (e.g., either the same memory space in a shared memory device or different memory spaces in the memory device). In one example, the transfer buffer 306 may implement the TX queues and RX queues for both the first and second processors 302 and 304 such that the first processor transmits aggregated data packets into the same memory space from which the second processor reads the aggregated data packets when notified by the first processor.

For data received on the forward link or downlink (i.e., data received at the access terminal), the data is received via the antenna 310 and collected at radio stack 308. The function driver 312 of the first processor 302 then transfers the data from the radio stack 308 into the Tx queue 316. The data aggregation module 324 and intelligent scheduler 326 selectively transfer bundled or aggregated data packets (also referred to as packet bundles) from the Tx queue 316 to the transfer buffer 306 based on one more factors or parameters. These factors or parameters may include, but are not limited to, a timeout value of timer 322, size of the Tx queue 316, one or more Tx queue levels (e.g., where a "level" may be defined as a certain amount of data contained in the queue, measured in bytes, packets, or other units pertinent to the data transfer type), size of the transfer buffer 306, one or more indicators of the data rates expected from the radio stack 308, a processor load indicator (e.g., load of the second processor 304), or a combination thereof. When the intelligent scheduler 326 determines that data is to be read from the Tx queue 316 and written to the transfer buffer 306, a read operation (from the Tx queue 316) and a write operation (to the transmit buffer 306) are performed, and an interrupt to the second processor 304 is generated. The interconnect driver 338, when responding to the interrupt, reads the aggregated data packets from the transfer buffer 306 and writes the data into Rx queue 336. The function driver 330 then reads the data packets from the Rx queue 336 and the unbundling module 332 separates the bundled packets into individual packets for sending to the upper layers (e.g., eventually to the application 348).

Note that, in this example, an interrupt signaling path or mechanism 317 may be present between the first and second processors 302 and 304. In other implementations, different techniques may be implemented to a processor when to read data from the transfer buffer 306.

Similarly, for data to be transmitted on the reverse link or the uplink (i.e., data to be transmitted from an access terminal to an access point or base station), the data is received from upper layers (e.g., the application 348) is written into the Tx queue 334. The data aggregation module 340 and the intelligent scheduler 342 selectively transfer bundled or aggregated data packets from the Tx queue 334 to the transfer buffer 306 based on one more factors or parameters. These factors or parameters may include, but are not limited to, a timeout value of the timer 344, size of the Tx queue 334, one or more Tx queue levels, size of the transfer buffer 306, a load indicator (e.g., load of the first processor 302), one or more indicators of the data rates expected from the application 348, or a combination thereof. When the intelligent scheduler 342 determines that data is to be read from the Tx queue 334 and written to the transfer buffer 306, a read operation and a write operation are performed, and an interrupt to the first processor 302 is generated. The interconnect driver 320, when responding to the interrupt, reads the aggregated data packets from the transfer buffer 306 and writes the data into Rx queue 318. The function driver 312 then reads the data packets from the Rx queue 318 and the unbundling module 314 separates the bundled packets into individual packets for sending to the radio stack 308.

According to one feature, data may be aggregated at the Tx queue (334 or 316) for transfer between the two processors 302 and 304. That is, rather than sending each data packet as it arrives in the Tx queue (316 or 334), the intelligent scheduler (326 and/or 342) causes the Tx queue (316 or 334) to accumulate data packets until a sufficiently large number of packets are accumulated. The accumulated data packets are then grouped or bundled as a single packet for transfer to the transfer buffer 306.

According to one example, the intelligent scheduler (326 or 342) may utilize low and high queue levels to determine when data transfer should be transferred. These watermark queue levels may be adjusted for differing 3G data rates or 4G data rates. The low and high queue levels may be used to determine when data packets accumulated in the Tx queue (316/334) can be transferred to the transfer buffer 306. For instance, the low queue level may indicate a minimum amount of data that should be kept in the Tx queue (316/334) while the high queue level may indicate a maximum amount of data that should be kept in the Tx queue.

Additionally, a timer (322 or 344) may also be utilized to facilitate aggregation of data prior to transfer between contexts. A maximum timeout value (as tracked by the timer 322 or 344) may be utilized so that data is not kept for a long time in the Tx queue 316/334. In one example, the timeout value (tracked by the timer 322/344) may be empirically determined or tuned by locating an inflection point on a graph that plots timer timeout value versus achieved data throughput. In one case, a peak value of throughput is used to obtain an optimum timeout value, which leads to an improved processor idle time performance (e.g., for first processor 302 and/or second processor 304 in a dual processor architecture).

Figure 4:
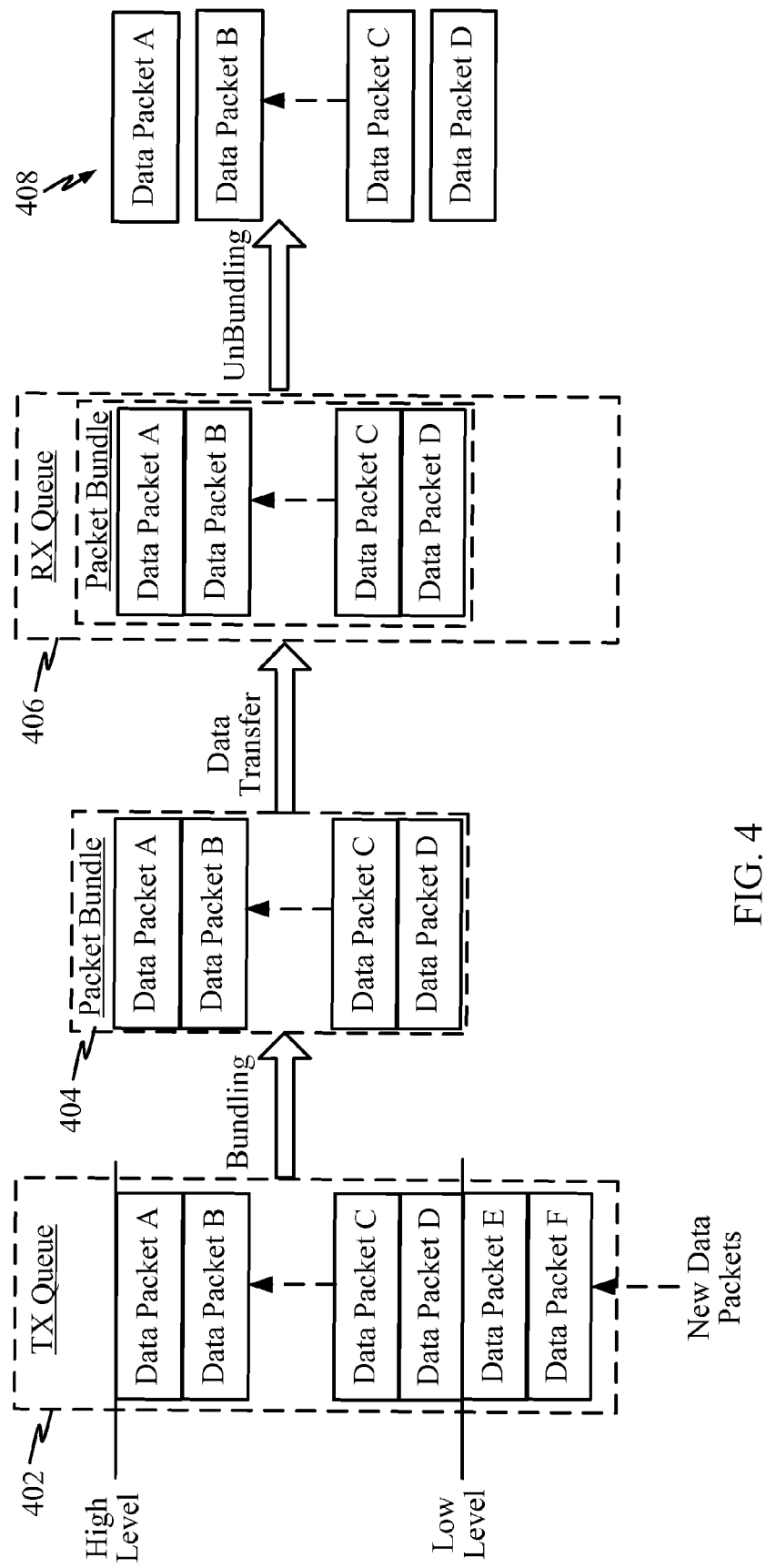
FIG. 4 is a block diagram illustrating the concept of data aggregation according to one example.

FIG. 4 is a block diagram illustrating the concept of data aggregation according to one example. A transmit queue 402 may collect a plurality of data packets (Data Packets A-F) in, for example, a first in first out basis. That is, rather than transmitting data packets as they arrive in the transmit queue 402, the processor collects a plurality of data packets and bundles or aggregates them into a packet bundle 404. The size of the packet bundle 404 and/or frequency with which the packet bundle 404 is transmitted may be based on one or more triggers. For example, the one or more triggers may include:

(a) a timeout trigger based on a maximum amount time between successive transfers of packet bundles from a first processor to a second processor;

(b) a queue level trigger based on a size for the transmit queue 402 (i.e., the queue in which the data packets are aggregated into the packet bundle);

(c) a buffer usage trigger based on the usage or capacity of a transfer buffer (i.e., buffer 306 in FIG. 3) within the shared memory used to transfer the packet bundle between the first processor and second processor;

(d) a load trigger based on the processing load for the second processor (i.e., the processor to which the packet bundle is being sent); and/or (e) a minimum data rate trigger based on a data rate at which the second processor transmits information over a wireless network.

The packet bundle 404 is then transferred to a receive queue 406 in a single context switch. That is, rather than utilizing multiple context switches to transfer each individual data packet, the data packets are grouped (e.g., by a low-level function such as the function driver or interconnect driver) as a packet bundle 406 and a single context switch is utilized by the transmitting processor to transmit the packet bundle 404 and a single context switch is utilized by the receiving processor to receive the packet bundle 404. The packet bundle 404 is received in a receive queue 406 and the packet bundle is the unbundled to extract the individual data packets 408. Note that even though it may take some operations to bundle and/or unbundled the data packets, such operations may be performed without additional context switches (or using fewer context switches), therefore making the transfer more efficient.

In one example, the "bundling" of data packets may merely involve transferring the individual data packets together or as a group (in a single context switch) with appropriate pointers to each data packet so that a receiving processor can read the data packets. In other implementations, the aggregated data packets may be encapsulated into a larger packet with some overhead data to identify its content.

Many mobile operating systems impose software architectures that necessitate context switching between OEM driver layers and the native operating system components, which inherently adds processing overhead to data networking functionality and may limit the opportunity to eliminate context switching requirements or optimize the overall code path. Furthermore, when the operating systems of the first processor 302 and second processor 304 differ, additional steps to reconcile the different operating system interfaces may be required to implement the data networking functionality, thereby adding further processor overhead. However, the data aggregation techniques described herein help to minimize expensive context switches on for such operating systems. That is, the intelligent scheduling of data transfers of multiple packets concurrently between the first processor 302 and the second processor 304. In another aspect, the intelligent scheduler may transfer multiple packets concurrently between a first process, thread or context and a second process, thread or context. The intelligent scheduler as described herein reduces the number of context switches needed to transfer the same amount of data between processors or processes, thereby improving processor performance and reducing overhead.

Queue Levels and Timeout Timer Operation

Referring to FIG. 3, according to one example of the operation of the intelligent scheduler (326/342), queue levels (e.g., High Level and Low Level in FIG. 4) and a timeout timer may be utilized to determine when data packets accumulated in the Tx queue (316/334) should be moved to the transfer buffer 306. For example, the data aggregation module 338 may write a bundled aggregation of multiple packet data units to the transfer buffer 306. A timer (322/344) is employed to account for and handle low size data exchanges (e.g., data for call set up) by triggering the writing process even when a triggering aggregate queue level (e.g., high queue level) has not yet been achieved. The timer (322/344) may also ensure that any maximum latency requirements are met and that data flows between the first processor 302 and the second processor 306 in a manner that conforms to those latency requirements.

Figure 5:
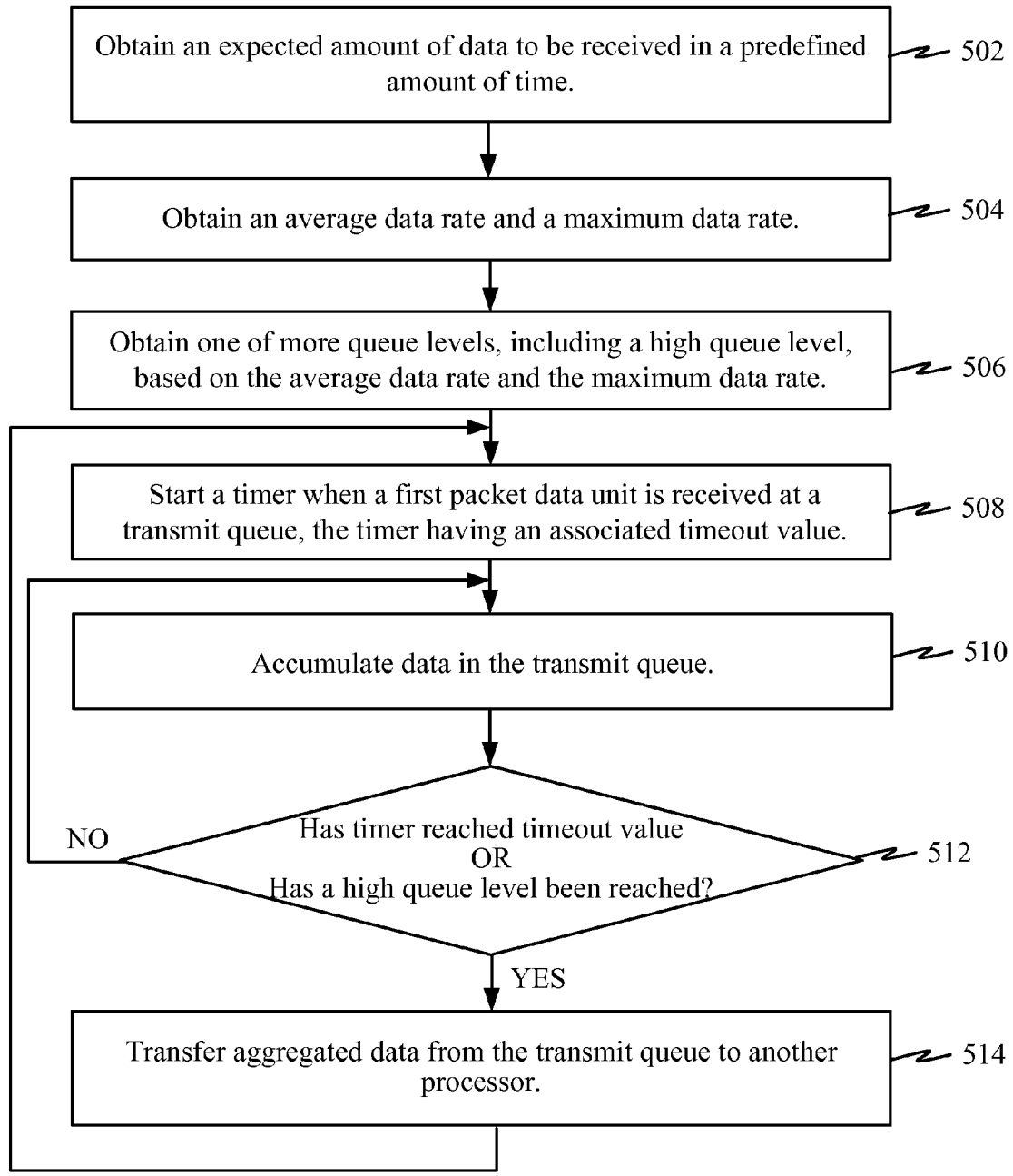
FIG. 5 illustrates a method that may be employed by an intelligent scheduler for utilizing queue levels and a timeout timer for data aggregation.

FIG. 5 illustrates a method that may be employed by an intelligent scheduler for utilizing queue levels and a timeout timer for data aggregation. An expected amount of data to be received for a predefined amount of time (e.g., X milliseconds) is first determined or obtained 502. Such determination may be made by considering factors, such as channel characteristics for a specific communication architecture (e.g., the specific communication standard employed and the typical data rates for that particular standard). For example, an average data rate and a maximum data rate may be determined or obtained 504. One of more queue levels, including a high queue level, are then determined or obtained based on the average data rate and maximum data rate 506. These queue levels can be, for example, a low level, a high level and a maximum level of data that can be stored in a queue (e.g., Tx queue) which is based at least in part on the expected amount of data to be received from the radio stack during a predefined time period. It is noted that other indicators of how full or empty the queue may be maintained to support a particular granularity needed for a particular application.

In one embodiment, when a first packet data unit (PDU) comes in to the Tx queue, a timer is started 508 which has an associated timeout value. Data is accumulated or aggregated or stacked in the Tx queue 510. It is noted that in this embodiment, aggregated data may be transferred between processes (or processors) rather than sending a single packet data unit (e.g., a single data packet) to the upper (next) layers one packet data unit at a time. The timeout value can be configured by a formula based on the queue depth and the consideration to avoid congestion or overloading the network side elements since once full, the queue contents may be transmitted before flow control can be applied.

In one example, the transmit queue size may be equal to a maximum data rate (bps) divided by timer timeout value(s). In another example, since data rates may vary over time, the transmit queue size may be larger than an average data rate for the maximum link speed. However, since memory is often limited on access terminals, the following steps may accommodate the memory limitation. In one aspect, the timer is configured for a very short duration (e.g., on the order of about 1 msec to about 255 msec), and the processor idle time and throughput are measured for various values of the timer timeout. An optimal tradeoff of latency (the timer timeout) versus reduced processor usage while attaining the maximum supported throughput may determine the ideal value of the timeout value.

In some cases, processor idle time may increase, but the throughput rate may decrease after the timer reaches a certain threshold that can be determined empirically, for example, by a characteristic process in which the timer threshold value is varied and the corresponding throughput measured. In this regard, the stacking or aggregation of data packets are suited for short bursts of data, especially for data protocols, such as TCP, which maintain state information and have provision for providing feedback corresponding to data sent and received. In one embodiment, the stacking of data packets for a time period or duration in the order of milliseconds achieves improvement in processor utilization, thereby resulting in an improvement in processor idle time. One consideration is that the timeout value be configured so that it is smaller than a minimum timeout value that the communication protocol specifies in order to avoid timeout issues that could result from data stacking for low size data exchanges (e.g., during connection setup) as described in greater detail hereinafter. Another consideration is that end-to-end latency requirements may influence selection of the timeout value such that the timeout value is relatively insignificant to the total latency.

When either the timer has reached the timeout value, or a high queue level is reached 512, but before the queue is completely full (e.g., a predefined percentage of being filled, such as 80% of queue is full), the aggregated data can be transferred from the transmit queue to another processor 514. For instance, aggregated data may be transferred to a transfer buffer from where it is retrieved by another processor and subsequently provided to the upper layers on the other processor, possibly in aggregated form. It is noted that the queue levels and timer values can be configured or adjusted differently in order to achieve an optimum configuration to suit a particular communication standard or specific communication technology. It is further noted that this process can be repeated, and one or more of the different parameters of factors (e.g., timeout values, queue levels, and processor loading indicators) can be customized for different communication technologies that may have different data rates.

Reducing Interrupts in Dual Processor Architectures

Note that the data packet aggregation scheme described herein reduces interrupts in dual processor architectures, thereby improving the efficiency of such processors.

In one configuration, a first processor may transfer data to a second processor via an intermediate transfer buffer or shared memory device. In a prior art approach, the first processor may write data to the transfer buffer one packet at a time. For example, when there is a data packet in the transmit queue of the first processor, an interconnect driver reads the data packet from the transmit queue and then writes that data packet to the transfer buffer. A hard interrupt is generated for the second processor whenever data is written to the transfer buffer by the interconnect driver of the first processor. Accordingly, this approach has the undesirable characteristic of decreasing the efficiency of the second processor as an interrupt is generated for each packet placed in the transfer buffer, no matter how small the packet. Similarly, when there is data to be transferred from the second processor to the first processor, the efficiency of the first processor is decreased since the interconnect driver executed on the second processor interrupts the first processor whenever it writes data to the transfer buffer.

In order to improve the transfer of packets between the first and second processors, data aggregation is employed. As previously described, data packets are aggregated by the sending processor based on one or more factors and then the aggregated data (i.e., more than one data packet at a time) is written to the transfer buffer, thereby reducing the number of interrupts to the receiving processor. For instance, if this aggregated data transfer technique is employed for transfer of data from a first processor to a second processor, the number of interrupts to the second processor is reduced, thereby increasing efficiency of the second processor.

Reducing Context Switching

Context switching occurs when a processor suspends or stops a process or thread in order to perform operations for another process or thread. For example, in FIG. 3 context switching may occur between Context 1, and Context 2, between Context 2 and Context 3, and between Context 3 and Context 4 as received data is passed from the interconnect driver to the application. Note that context switching, such as switching between different processes or threads that are executing on a processor, incur overhead thereby increasing latency of the processor. Therefore, it is advantageous to reduce context switching when possible but without introducing unacceptable delay.

As described above, data aggregation may serve to bundle or group a plurality of data packets into a single packet for purposes of transmission from one processor to another processor. That is, rather than sending individual data packets from one processor to another processor across a boundary (i.e., thereby causing multiple context switches and/or interrupts), the aggregated data packets are sent together (thereby triggering just one context switch or interrupt). In this manner, bundles of data are transferred between entities as aggregated data packets requiring or utilizing a single context switch instead of transferring individual data packets in a plurality of context switches. Stated differently, the number of context switches used to transfer a fixed amount of data is reduced by the data aggregation technique described herein.

In an alternative approach, another manner in which to reduce context switching is to implement a hold-off signaling mechanism. For example, the originator of data (e.g., thread or process that has data to transfer or send) can send a hold-off signal to the receiver of the data. The hold-off signal instructs the receiver (e.g., receiving thread or process) not to read from a particular memory location until a predefined amount of data has been accumulated (e.g., written to the storage location (e.g., a storage queue)). In this manner, the number of context switches to handle a given amount of data can be reduced by processing multiple packets with a single context switch. It is noted that the signaling can be implemented across boundaries (e.g., between processors 302 and 304 in FIG. 3) by utilizing a predefined interface (e.g., application programming interface (API)) between entities (e.g., processes, threads, drivers, etc.) that reside on different sides of such boundaries.

Alternative Data Aggregation Example

Figure 6:
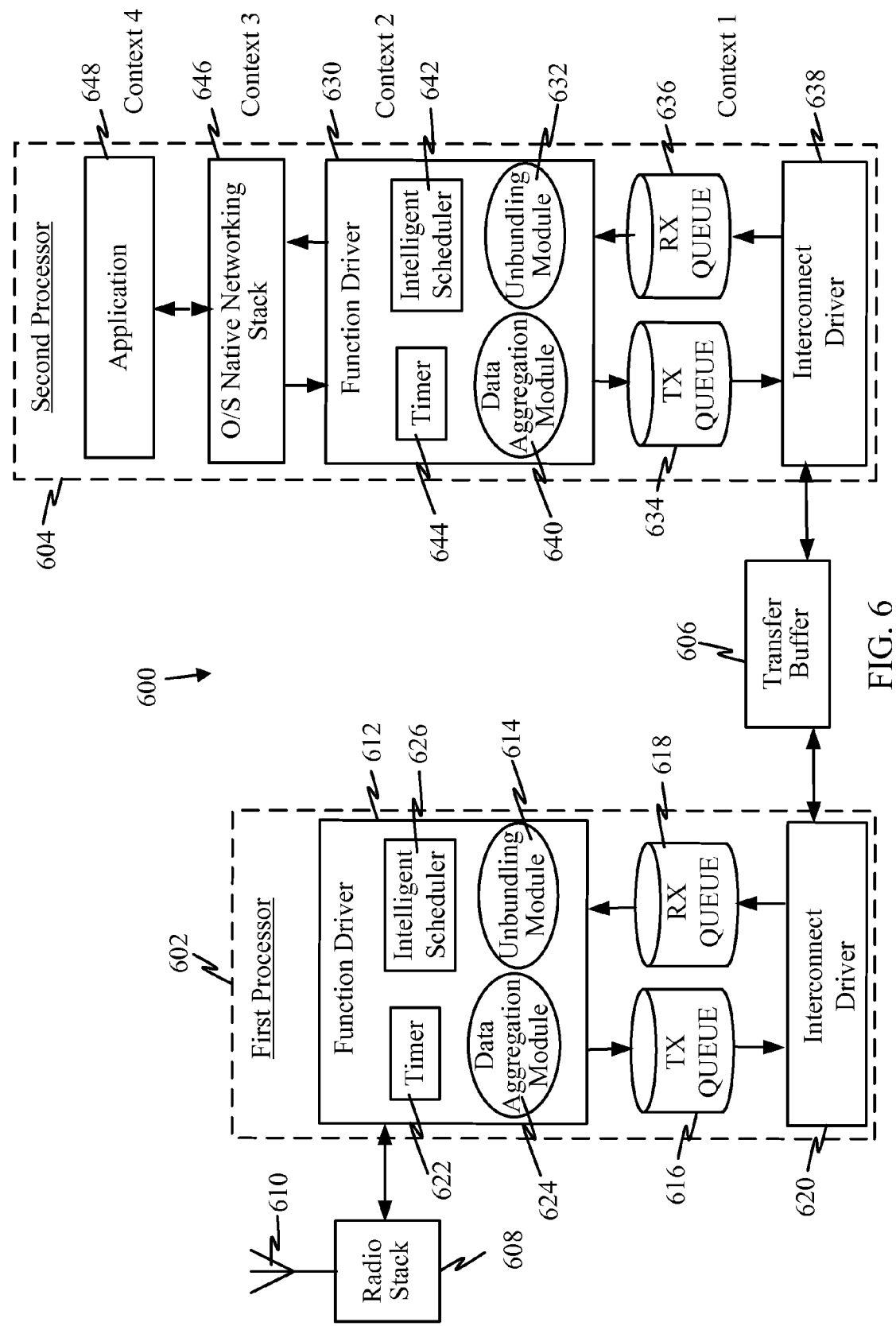
FIG. 6 illustrates another example of a dual processor architecture which may be adapted to perform data aggregation.

FIG. 6 illustrates another example of a dual processor architecture which may be adapted to perform data aggregation. The dual processor architecture 600 is similar to that of FIG. 3 and may include a first processor 602 and a second processor 604. The first processor 602 and second processor 604 may exchange data by using a transfer buffer 606 (e.g., a shared memory, etc.). The first processor 602 may also be coupled to a radio stack 608 and an antenna 610 for receiving and transmitting data over a wireless network.

In this example, the data aggregation is controlled by the function driver 612/630 of the first and second processors 602/604 rather than by the interconnect driver 620/638, respectively.

The first processor 602 may include or execute a function driver 612, a transmit (Tx) queue 616, a receive (Rx) queue 618, and/or an interconnect driver 620. The function driver 612 may include or implement a data aggregation module 624, an unbundling module 614, a timer 622, and/or an intelligent scheduler 626.

The second processor 604 may include or implement a function driver 630, a transmit (Tx) queue 634, a receive (Rx) queue 636, an interconnect driver 638, an operating system networking stack 646, and/or one or more applications 648. The function driver 630 may include or implement a data aggregation module 640, an unbundling module 632, an intelligent scheduler 642, and/or a timer 644.

The elements and/or modules illustrated for the first processor 602 and second processor 604 may be functional components operating within each processor and/or may be combined with other components.

For data received on the forward link or downlink (i.e., data received at the access terminal), the data is received via the antenna 610 and collected at radio stack 608. The function driver 612 of the first processor 602 then transfers the data from the radio stack 608 into the Tx queue 616. The function driver 612 may control when data is transferred out from the Tx queue 616. That is, the data aggregation module 624 may bundle or aggregate the data in the Tx queue 616 and the intelligent scheduler 626 may indicate to the interconnect driver 620 when the aggregated data is to be transferred into the transfer buffer 606 based on one more factors or parameters. These factors or parameters may include, but are not limited to, a timeout value of timer 622, size of the Tx queue 616, one or more Tx queue levels, size of the transfer buffer 606, one or more indicators of the data rates expected from the radio stack 608, a processor load indicator (e.g., load of the second processor 604), or a combination thereof. When the intelligent scheduler 626 determines that data is to be read from the Tx queue 616 and written to the transfer buffer 606, it indicates to the interconnect driver 620 to perform a read operation (from the Tx queue 616) and a write operation (to the transmit buffer 606). An interrupt to the second processor 604 is also generated. The interconnect driver 638, when responding to the interrupt, reads the aggregated data packets from the transfer buffer 606 and writes the data into Rx queue 636. The function driver 630 then reads the data packets from the Rx queue 636 and the unbundling module 632 separates the bundled packets into individual packets for sending to the upper layers (e.g., eventually to the application 648).

Similarly, for data to be transmitted on the reverse link or the uplink (i.e., data to be transmitted from an access terminal to an access point or base station), the data is received from upper layers (e.g., the application 648) is written into the Tx queue 634. In this implementation, the function driver 630 controls the data aggregation and transfer from the Tx queue 634. That is, the data aggregation module 640 bundles or aggregates data packets in the Tx queue 634 and the intelligent scheduler 642 indicates to the interconnect driver 638 when to transfer the aggregated data packets from the Tx queue 634 to the transfer buffer 606 based on one more factors or parameters. These factors or parameters may include, but are not limited to, a timeout value of the timer 644, size of the Tx queue 634, one or more Tx queue levels, size of the transfer buffer 606, a load indicator (e.g., load of the first processor 602), one or more indicators of the data rates expected from the application 648, or a combination thereof. When the intelligent scheduler 642 determines that data is to be read from the Tx queue 634 and written to the transfer buffer 606, it indicates to the interconnect driver 638 to perform a read operation from the Tx queue 634 and a write operation to the transfer buffer 606. An interrupt to the first processor 602 is also generated. The interconnect driver 620, when responding to the interrupt, reads the aggregated data packets from the transfer buffer 606 and writes the data into Rx queue 618. The function driver 612 then reads the data packets from the Rx queue 618 and the unbundling module 614 separates the bundled packets into individual packets for sending to the radio stack 608.

According to one feature, data may be aggregated at the Tx queue (634 or 616) for transfer between the two processors 602 and 604. That is, rather than sending each individual data packet as it arrives in the Tx queue (616 or 634), the intelligent scheduler (626 and/or 642) causes the Tx queue (616 or 634) to accumulate data packets until a sufficiently large number of packets are accumulated. The accumulated data packets are then grouped or bundled as a single packet for transfer to the transfer buffer 606.

According to one example, the intelligent scheduler (626 or 642) may utilize low and high queue levels to determine when data transfer should be transferred. These watermark queue levels may be adjusted for differing 3G data rates or 4G data rates. The low and high queue levels may be used to determine when data packets accumulated in the Tx queue (616/634) can be transferred to the transfer buffer 606. For instance, the low queue level may indicate a minimum amount of data that should be kept in the Tx queue (616/634) while the high queue level may indicate a maximum amount of data that should be kept in the Tx queue.

Additionally, the timer (622 or 644) may also be utilized to facilitate aggregation of data prior to transfer between contexts. A maximum timeout value (as tracked by the timer 622 or 644) may be utilized so that data is not kept for a long time in the Tx queue 616/634. In one example, the timeout value (tracked by the timer 622/644) may be empirically determined or tuned by locating an inflection point on a graph that plots timer timeout value versus achieved data throughput. In one case, a peak value of throughput is used to obtain an optimum timeout value, which leads to an improved processor idle time performance (e.g., for first processor 602 and/or second processor 604 in a dual processor architecture).

Figure 7:
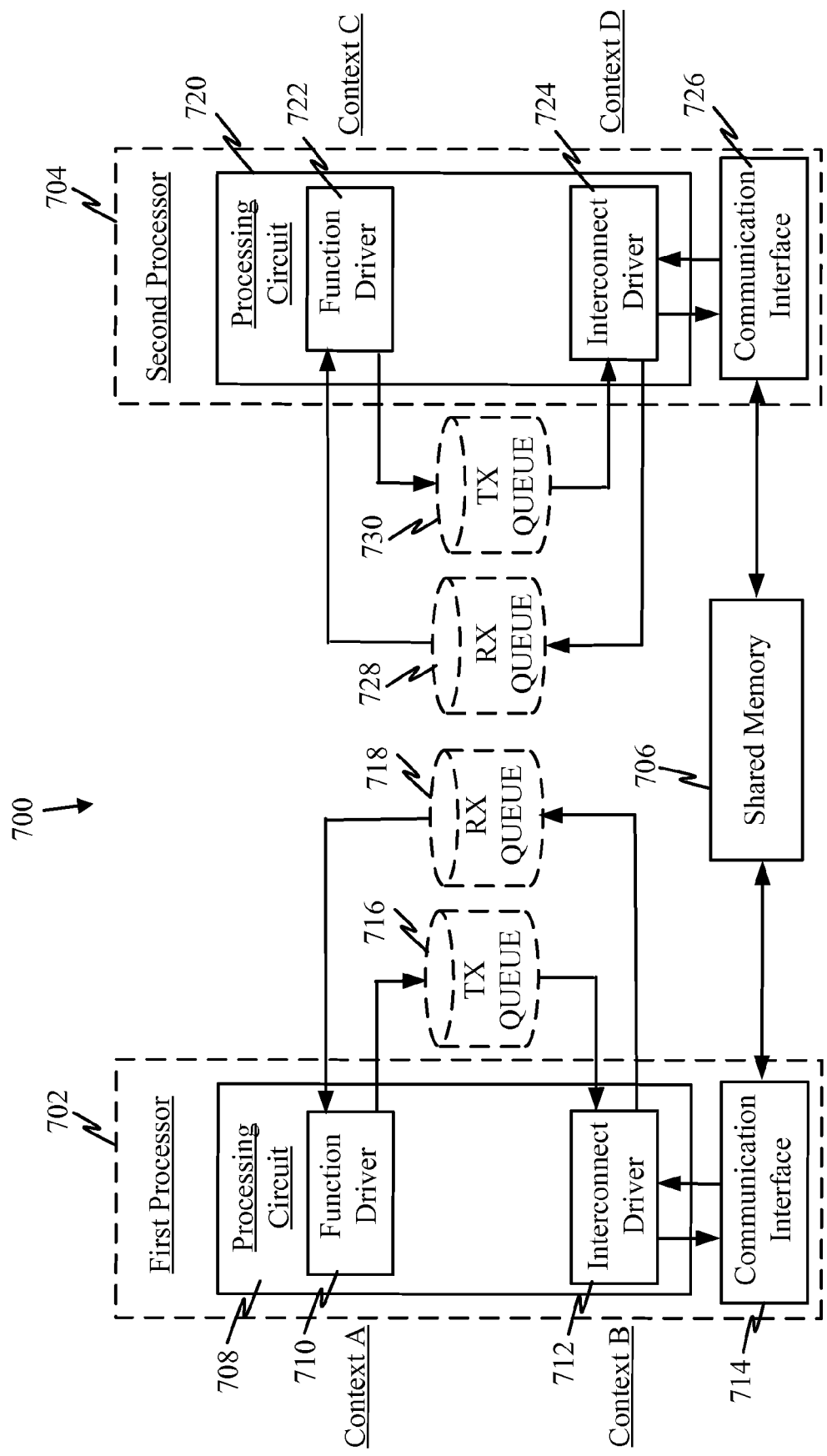
FIG. 7 is a block diagram illustrating a device including a first processor and a second processor and adapted to efficiently transfer data packets between the two processors using a shared memory.

FIG. 7 is a block diagram illustrating a device including a first processor 702 and a second processor 704 and adapted to efficiently transfer data packets between the two processors using a shared memory 706. The device 700 may be an access terminal such as a wireless communication device, for example. The first processor 702 may include a processing circuit 708 coupled to a communication interface 714. The processing circuit 708 may implement or include a function driver 710 and an interconnect driver 712 which may utilize a transmit queue 716 and/or receive queue 718 to transfer data between each other. Note that the transmit queue 716 and receive queue 718 may be implemented within the first processor 702, may be implemented in an external memory device, or even in the shared memory 706. Similarly, the second processor 704 may include a processing circuit 720 coupled to a communication interface 726. The processing circuit 720 may implement or include a function driver 722 and an interconnect driver 724 which may utilize a transmit queue 730 and/or receive queue 728 to transfer data between each other. Note that the transmit queue 730 and receive queue 728 may be implemented within the second processor 704, may be implemented in an external memory device, or even in the shared memory 706.

According to one feature, the processing circuit 708 may be adapted to: (a) aggregate data packets into a packet bundle, and/or (b) process the packet bundle in a single context switch when transferring the packet bundle to the second processor 704 via a shared memory 706, wherein a processing load of the first processor 702 is reduced due to the aggregation of the data packets into the packet bundle. Note that the first processor 702 may implement functions across multiple layers and performs context switching between the functions. The processing circuit 702 may implement a function driver 710 and an interconnect driver 712 that transfer data between each other via a transmit queue 716 and a receive queue 718. In this example, rather than utilizing multiple context switches to transfer data packets between the function driver 710 and the interconnect driver 714, a single context switch (e.g., from Context A to Context B) may be used to transfer a packet bundle, thereby reducing the processing load of the first processor 702. Note that the use of a packet bundle also allows the use of a single context switch (e.g., Context C to/from Context D) between the function driver 722 and the interconnect driver 724 at the second processor 702, thereby reducing the processing load of the second processor 702.

In one implementation, the interconnect driver 712 may control the aggregation of the data packets in the transmit queue 716 and schedules the transfer of the packet bundle to the second processor 704. In another example, the function driver 710 may control the aggregation of the data packets in the transmit queue 716 and schedules the transfer of aggregated data packets to the second processor 704. Note that one benefit of directing or controlling data packet aggregation at either the function driver 722 and/or the interconnect driver 724 is that such aggregation occurs at a low level or layer of an operating system. Consequently, such aggregation is transparent to applications and/or networking stack at higher levels.

The transmit queue 716 and/or receive queue 718 may be implemented within the shared memory 706 or may be implemented within the first processor 708.

According to another feature, the processing circuit 708 may be adapted to: (a) obtain a packet bundle via a shared memory 706 from the second processor 704 in a single context switch, wherein the packet bundle includes aggregated data packets, and/or (b) unbundle the packet bundle into a plurality of data packets, wherein a processing load of the first processor 702 is reduced due to the aggregation of the data packets into the packet bundle by the second processor 704. In one example, the processing circuit may be adapted to receive an interrupt indicating that a data bundle is being transferred from the second processor 704. The processing load of the second processor 704 is reduced due to the aggregation of the data packets into the packet bundle.

Consequently, an access terminal is provided comprising the first processor 702, the second processor 704 and the shared memory 706. The first processor 702 may be adapted to aggregate a plurality of data packets into a packet bundle. The shared memory may be coupled to the first processor and may be used by the first processor to transfer the packet bundle to the second processor 704, wherein the transfer of the packet bundle is performed in a single context switch by the first processor 702. The second processor 704 may also be coupled to the shared memory and may be adapted to obtain the packet bundle from the shared memory and unbundle the packet bundle into individual data packets, wherein a processing load of the second processor 704 is reduced due to the aggregation of the data packets into the packet bundle by the first processor 702.

Additionally, the second processor 704 may be further adapted to aggregate a second plurality of data packets into a second packet bundle and transfer the second packet bundle from the second processor 704 to the first processor 702 using the shared memory 706, wherein the transfer of the packet bundle is performed in a single context switch by the second processor 704. The first processor 702 may be further adapted to unbundle the second packet bundle into individual data packets at the first processor 702, wherein a processing load of the first processor 702 is reduced due to the aggregation of the data packets into the second packet bundle by the second processor 704.

Note that the data aggregation techniques described herein may be implemented in a multi-processor system, circuit, or device. Thus, such data aggregation may be implemented among N processors, where N is two or greater.

Figure 8:
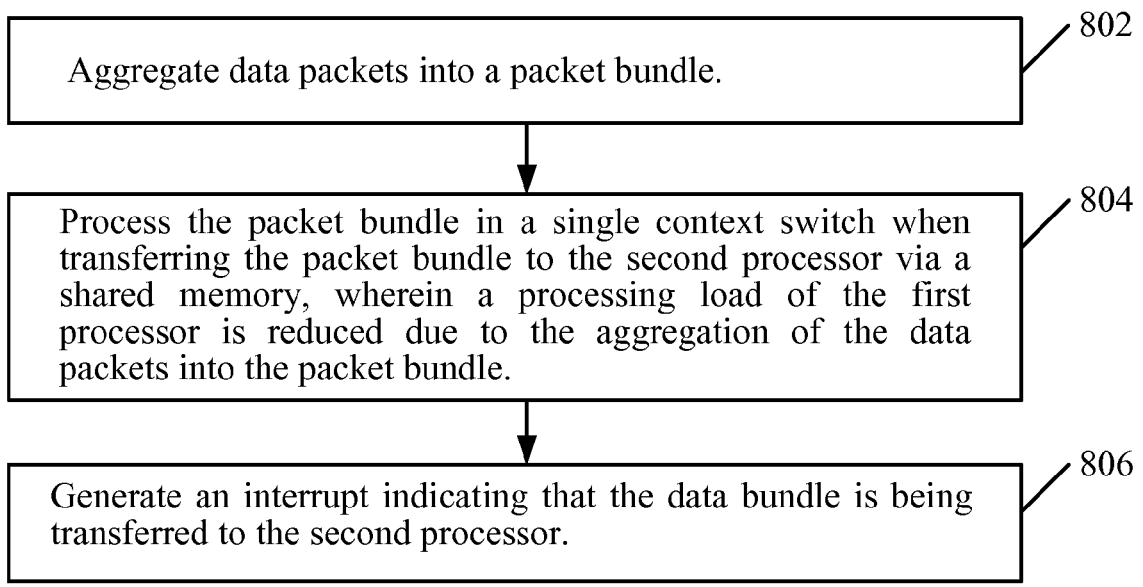
FIG. 8 illustrates a method operational in a first processor to transfer bundled data to a second processor.

FIG. 8 illustrates a method operational in a first processor to transfer bundled data to a second processor. The first processor may aggregate data packets into a packet bundle 802. The packet bundle may be process in a single context switch when transferring the packet bundle to the second processor via a shared memory, wherein a processing load of the first processor is reduced due to the aggregation of the data packets into the packet bundle 804. The first processor may generate an interrupt indicating that the data bundle is being transferred to the second processor 806. A processing load of the second processor may be reduced due to the aggregation of the data packets into the packet bundle. Aggregating data packets into the packet bundle also reduces context switching at the first processor and/or second processor. For instance, context switching at the first processor may be reduced by virtue of aggregating the data packets into a packet bundle so that fewer data transfer operations are performed by the first processor for the same amount of data packets. A context switch may be the interleaved sharing of a processing resource by multiple functions.

The packet bundle may be transferred to the second processor upon occurrence of one or more triggers, wherein the one or more triggers include at least one of:
  (a) a timeout trigger based on a maximum amount time between successive transfers of packet bundles from the first processor to the second processor;
  (b) a queue level trigger based on a size for a transmit queue where the data packets are aggregated into the packet bundle;
  (c) a buffer usage trigger based on the usage of a transfer buffer within the shared memory used to transfer the packet bundle between the first processor and second processor;
  (d) a load trigger based on the load for the second processor; or
  (e) a minimum data rate trigger based on a data rate at which the second processor transmits information over a wireless network.

According to one example, the first processor may implement functions across multiple layers and performs context switching between the functions. The functions may include a function driver and an interconnect driver that transfer data between each other via a transmit queue and a receive queue. In one implementation, the interconnect driver may control the aggregation of the data packets in the transmit queue and schedules the transfer of the packet bundle to the second processor. In another example, the function driver may control the aggregation of data packets in the transmit queue and schedules the transfer of the packet bundle to the second processor.

Figure 9:
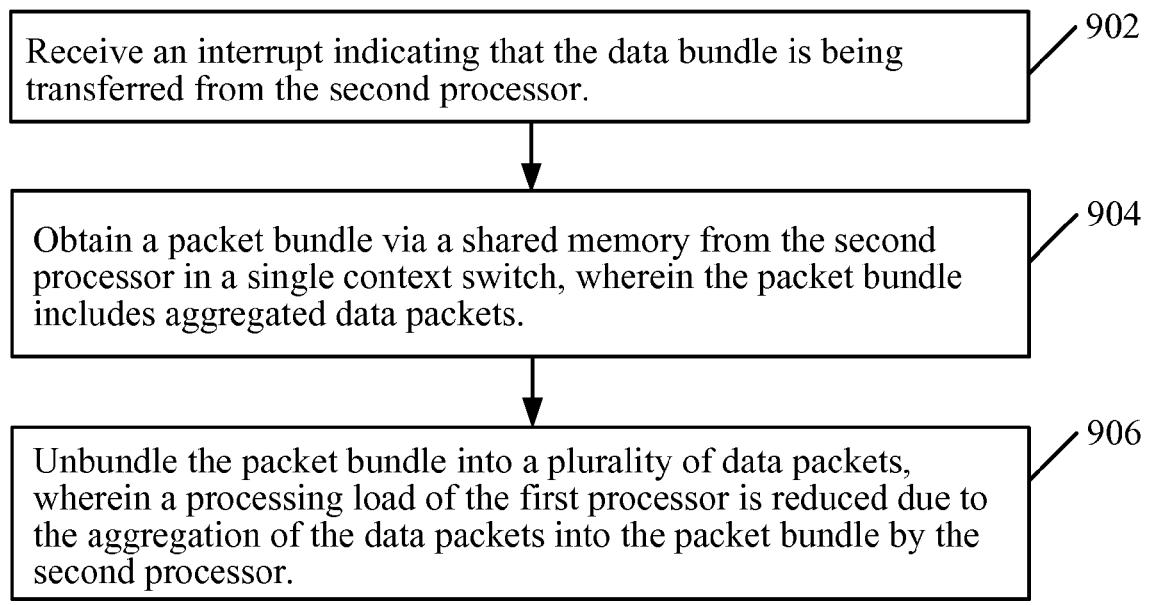
FIG. 9 illustrates a method operational in a first processor to receive bundled data to a second processor.

FIG. 9 illustrates a method operational in a first processor to receive bundled data to a second processor. The first processor may receive an interrupt indicating that the data bundle is being transferred from the second processor 902. In response to such interrupt, the first processor may obtain a packet bundle via a shared memory from the second processor in a single context switch, wherein the packet bundle includes aggregated data packets 904. The first processor may then unbundle the packet bundle into a plurality of data packets, wherein a processing load of the first processor is reduced due to the aggregation of the data packets into the packet bundle by the second processor 906. A processing load of the second processor may also be reduced due to the aggregation of the data packets into the packet bundle. The first processor may implement functions across multiple layers and performs context switching between the functions, and the functions include a function driver and an interconnect driver that transfer data between each other via a transmit queue and a receive queue.

Figure 10:
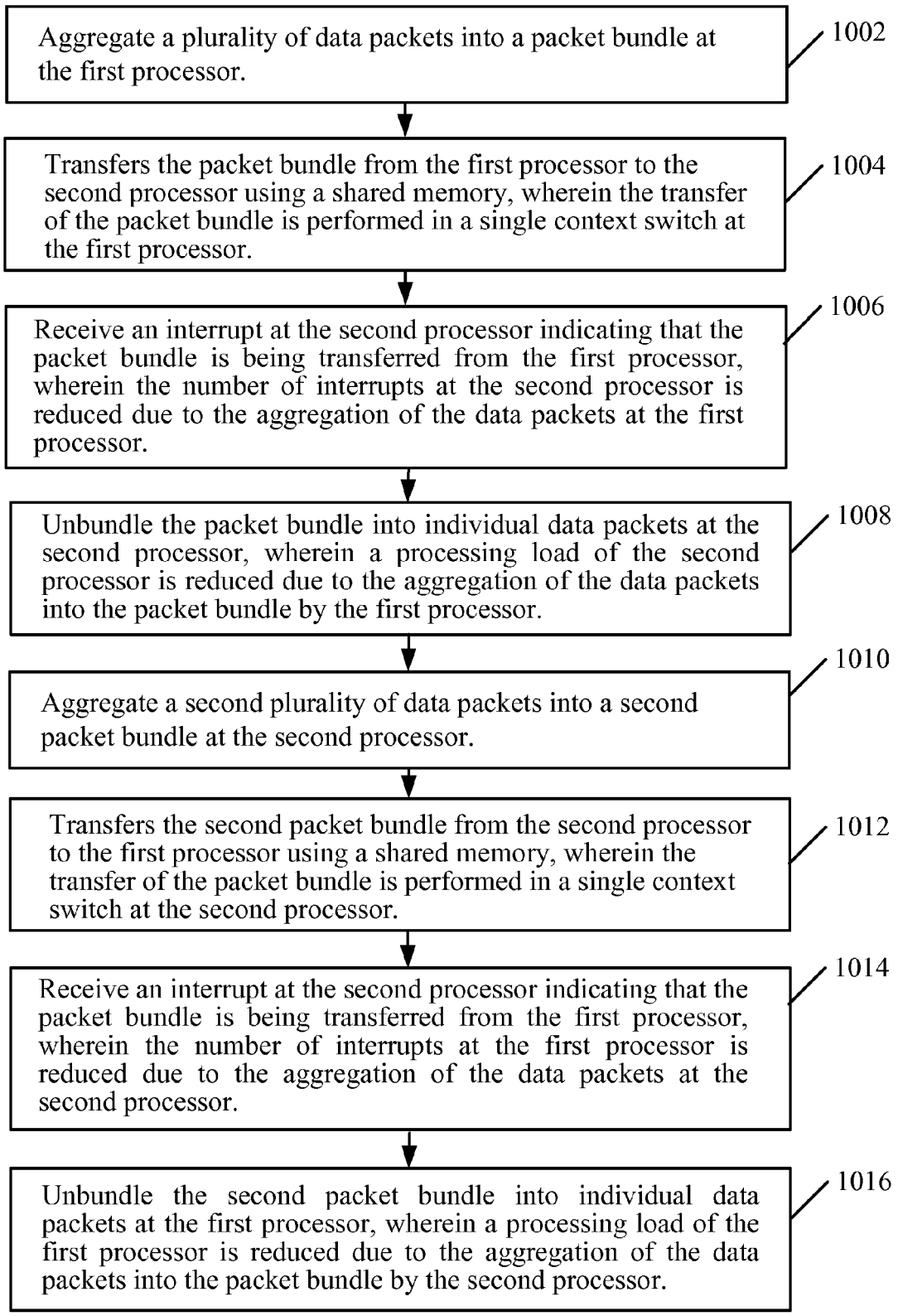
FIG. 10 illustrates a method operational in a dual processor access terminal to more efficiently transfer data packets between the dual processors.

FIG. 10 illustrates a method operational in a dual processor access terminal to more efficiently transfer data packets between the dual processors. According to a first feature a plurality of data packets may be aggregated into a packet bundle at the first processor 1002. The first processor then transfers the packet bundle to the second processor using a shared memory, wherein the transfer of the packet bundle is performed in a single context switch at the first processor 1004. The first processor may generate, the second processor may receive an interrupt indicating that the packet bundle is being transferred from the first processor, wherein the number of interrupts at the second processor is reduced due to the aggregation of the data packets at the first processor 1006. The second processor may then unbundle the packet bundle into individual data packets, wherein a processing load of the second processor is reduced due to the aggregation of the data packets into the packet bundle by the first processor 1008. Note that, in one implementation, in the first processor may be an application processor and the second processor may be a modem processor, both processors operating within a wireless communication device. In another implementation, the second processor may be an application processor and the first processor may be a modem processor operating with a wireless communication device.

According to yet another feature, the packet bundle may be transferred to the second processor upon occurrence of one or more triggers. The one or more triggers may include at least one of:

(a) a timeout trigger based on a maximum amount time between successive transfers of packet bundles from the first processor to the second processor;

(b) a queue level trigger based on a size for a transmit queue where the data packets are aggregated into the packet bundle;

(c) a buffer usage trigger based on the usage of a transfer buffer within the shared memory used to transfer the packet bundle between the first processor and second processor;

(d) a load trigger based on the load for the second processor; or (e) a minimum data rate trigger based on a data rate at which the second processor transmits information over a wireless network.

The first processor and second processors may each implement functions across multiple layers, the functions at each of the first and second processors may include a function driver and an interconnect driver that transfer data between each other via a transmit queue and a receive queue. In a first example, the interconnect driver may control the aggregation of data packets in the transmit queue and schedules the transfer of the packet bundle to the second processor. In a second example, the function driver may control the aggregation of data packets in the transmit queue and schedules the transfer of the packet bundle to the second processor.

The method may further comprise aggregating a second plurality of data packets into a second packet bundle at the second processor 1010. The second packet bundle is then transferred from the second processor to the first processor using the shared memory, wherein the transfer of the packet bundle is performed in a single context switch at the second processor 1012. The second processor may then generate and the first processor may receive an interrupt indicating that the packet bundle is being transferred from the second processor, wherein the number of interrupts at the first processor is reduced due to the aggregation of the second plurality of data packets at the second processor 1014. The first processor may then unbundle the second packet bundle into individual data packets, wherein a processing load of the first processor is reduced due to the aggregation of the data packets into the second packet bundle by the second processor 1016.

It should be recognized that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

One or more of the components, steps, and/or functions illustrated in the Figures may be rearranged and/or combined into a single component, step, or function or embodied in several components, steps, or functions. Additional elements, components, steps, and/or functions may also be added without departing from the invention. The apparatus, devices, and/or components illustrated in the Figures may be configured to perform one or more of the methods, features, or steps described in the Figures. In some implementations, the novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems without departing from the invention. It should be noted that the foregoing embodiments are merely examples and are not to be construed as limiting. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in a first processor for transferring data to a second processor, the method comprising:
   aggregating data packets into a packet bundle;
   processing the packet bundle in a single context switch when transferring the packet bundle to the second processor via a shared memory, wherein a processing load of the first processor is reduced due to the aggregation of the data packets into the packet bundle;
   suspending the processing associated with transferring the packet bundle; and
   switching context to perform operations for another process,
   wherein the first processor implements functions across multiple layers and performs context switching between the functions;
   wherein the functions include a function driver and an interconnect driver that transfer data between each other via a transmit queue and a receive queue; and
   wherein the interconnect driver controls the aggregation of the data packets in the transmit queue and schedules the transfer of the packet bundle to the second processor.

2. A method operational in a first processor for transferring data to a second processor, the method comprising:
   aggregating data packets into a packet bundle;
   processing the packet bundle in a single context switch when transferring the packet bundle to the second processor via a shared memory, wherein a processing load of the first processor is reduced due to the aggregation of the data packets into the packet bundle;
   suspending the processing associated with transferring the packet bundle; and
   switching context to perform operations for another process,
   wherein the first processor implements functions across multiple layers and performs context switching between the functions;
   wherein the functions include a function driver and an interconnect driver that transfer data between each other via a transmit queue and a receive queue; and
   wherein the function driver controls the aggregation of data packets in the transmit queue and schedules the transfer of the packet bundle to the second processor.

3. A first processor comprising:
   a communication interface for exchanging data with a second processor;
   a processing circuit coupled to the communication interface, wherein the processing circuit is adapted to
      aggregate data packets into a packet bundle;
      process the packet bundle in a single context switch when transferring the packet bundle to the second processor via a shared memory, wherein a processing load of the first processor is reduced due to the aggregation of the data packets into the packet bundle;
      suspend the process associated with transferring the packet bundle; and
      switch context to perform operations for another process,
   wherein the processing circuit implements a function driver and an interconnect driver that transfer data between each other via a transmit queue and a receive queue; and
   wherein the interconnect driver controls the aggregation of the data packets in the transmit queue and schedules the transfer of the packet bundle to the second processor.

4. A first processor comprising:
   a communication interface for exchanging data with a second processor;
   a processing circuit coupled to the communication interface, wherein the processing circuit is adapted to
      aggregate data packets into a packet bundle;
      process the packet bundle in a single context switch when transferring the packet bundle to the second processor via a shared memory, wherein a processing load of the first processor is reduced due to the aggregation of the data packets into the packet bundle;
      suspend the process associated with transferring the packet bundle; and
      switch context to perform operations for another process,
   wherein the processing circuit implements a function driver and an interconnect driver that transfer data between each other via a transmit queue and a receive queue; and
   wherein the function driver controls the aggregation of the data packets in the transmit queue and schedules the transfer of aggregated data packets to the second processor.

5. A method for transferring data from a first processor to a second processor, the method comprising:
   aggregating a plurality of data packets into a packet bundle at the first processor;
   transferring the packet bundle from the first processor to the second processor using a shared memory, wherein the transfer of the packet bundle is performed in a single context switch at the first processor before the process associated with the transfer of the packet bundle is suspended in order to perform operations for another process; and unbundling the packet bundle into individual data packets at the second processor, wherein a processing load of the second processor is reduced due to the aggregation of the data packets into the packet bundle by the first processor, wherein the first processor and second processor each implements functions across multiple layers, the functions at each of the first and second processors include a function driver and an interconnect driver that transfer data between each other via a transmit queue and a receive queue; and wherein the interconnect driver controls the aggregation of data packets in the transmit queue and schedules the transfer of the packet bundle to the second processor.

6. A method for transferring data from a first processor to a second processor, the method comprising:

aggregating a plurality of data packets into a packet bundle at the first processor;

transferring the packet bundle from the first processor to the second processor using a shared memory, wherein the transfer of the packet bundle is performed in a single context switch at the first processor before the process associated with the transfer of the packet bundle is suspended in order to perform operations for another process; and unbundling the packet bundle into individual data packets at the second processor, wherein a processing load of the second processor is reduced due to the aggregation of the data packets into the packet bundle by the first processor, wherein the first processor and second processor each implements functions across multiple layers, the functions at each of the first and second processors include a function driver and an interconnect driver that transfer data between each other via a transmit queue and a receive queue; and wherein the function driver controls the aggregation of data packets in the transmit queue and schedules the transfer of the packet bundle to the second processor.

* * * * *